J. O. HEINZE.
TRACTOR.
APPLICATION FILED DEC. 6, 1919.

1,393,780.

Patented Oct. 18, 1921.
10 SHEETS—SHEET 3.

Inventor
John O. Heinze

By Offield, Towle, Graves & Soans Attys.

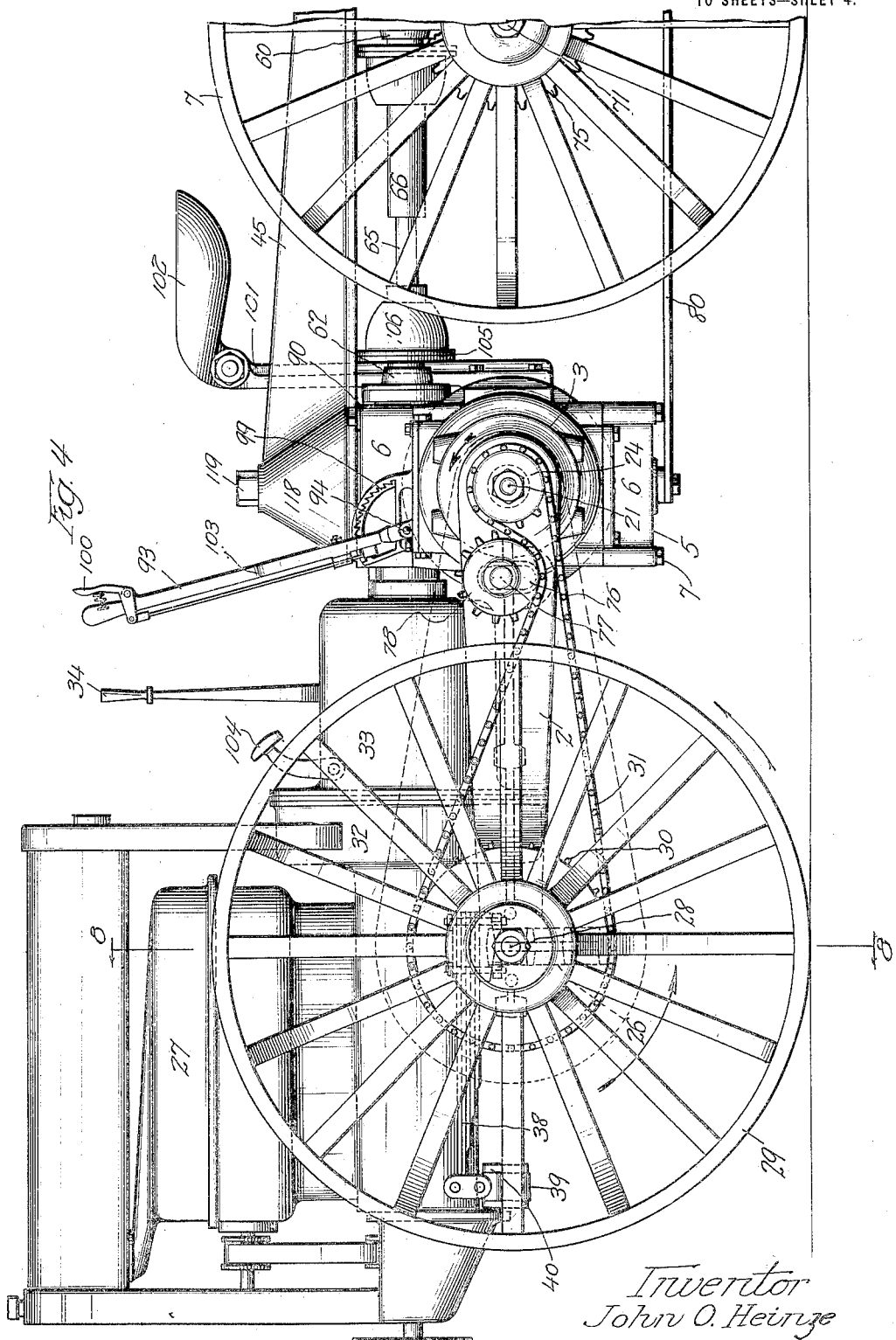

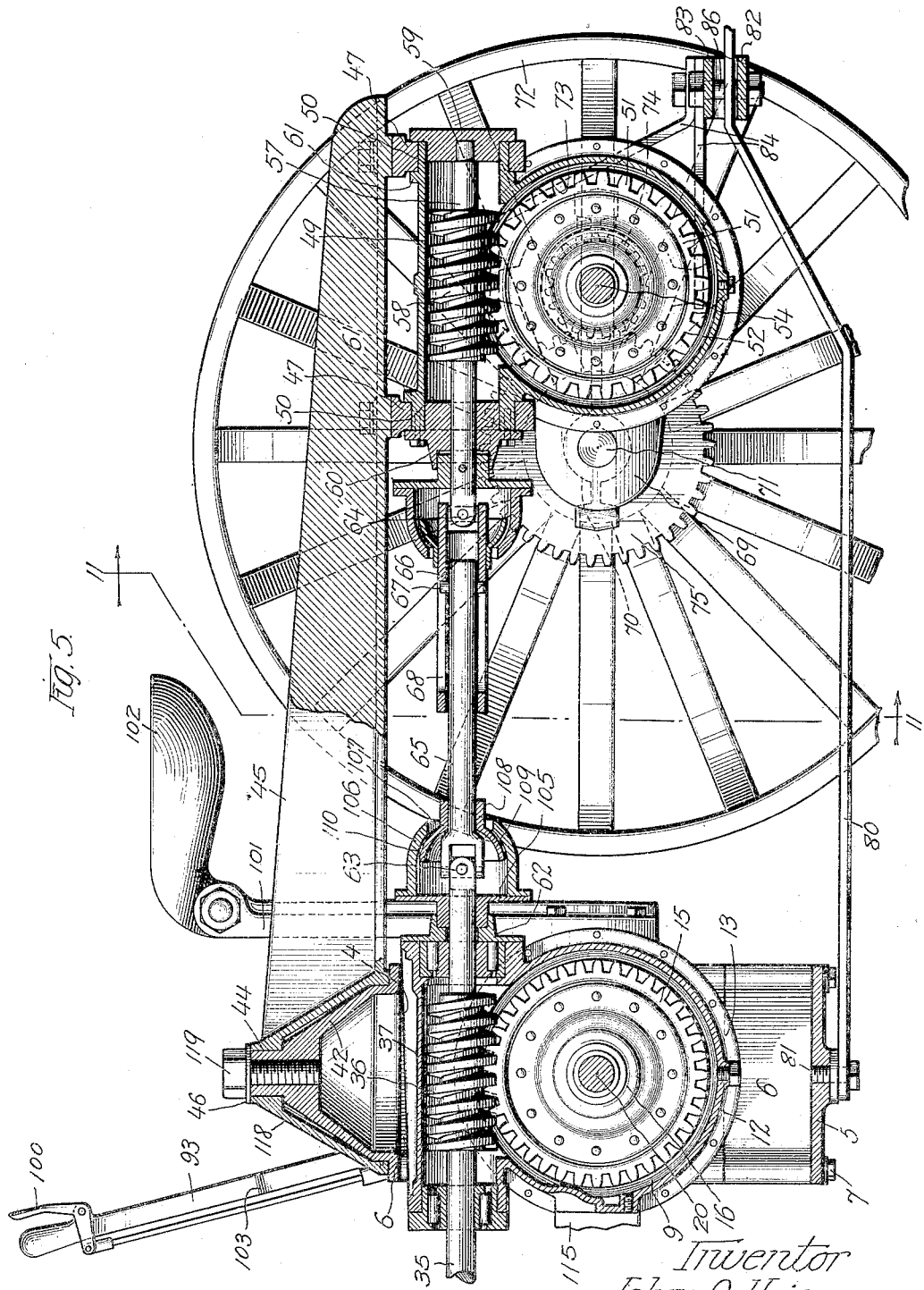

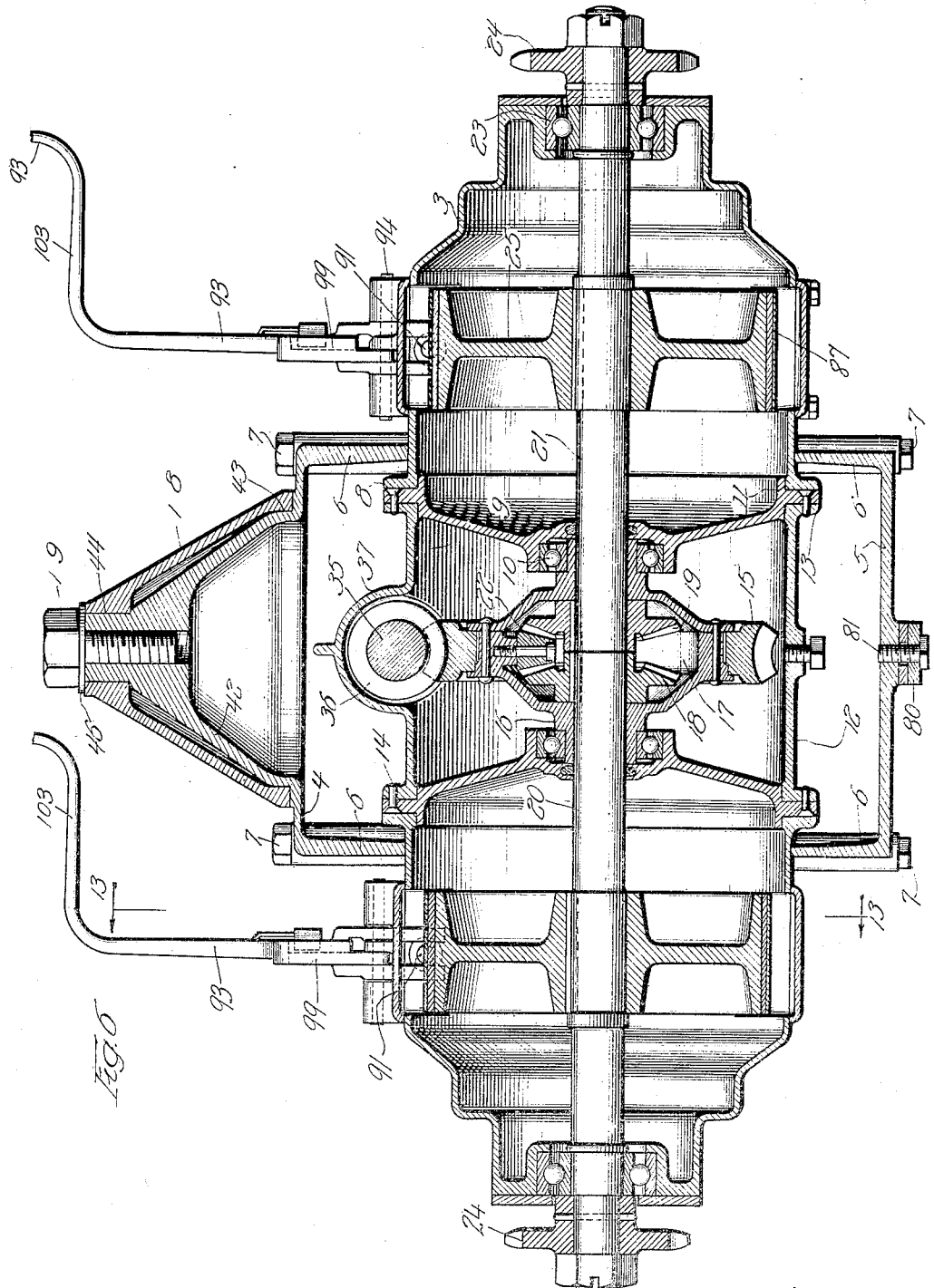

J. O. HEINZE.
TRACTOR.
APPLICATION FILED DEC. 6, 1919.
1,393,780.
Patented Oct. 18, 1921.
10 SHEETS—SHEET 7.
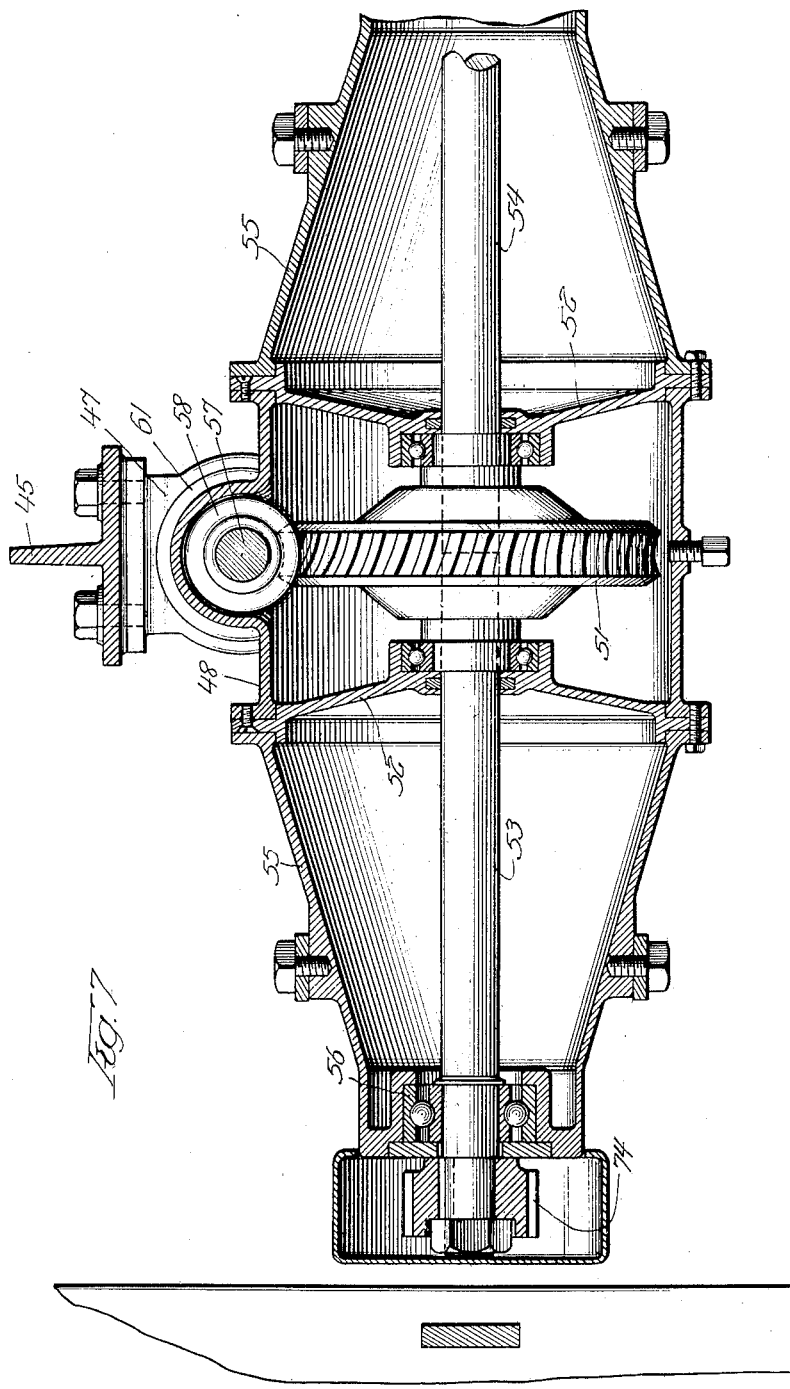

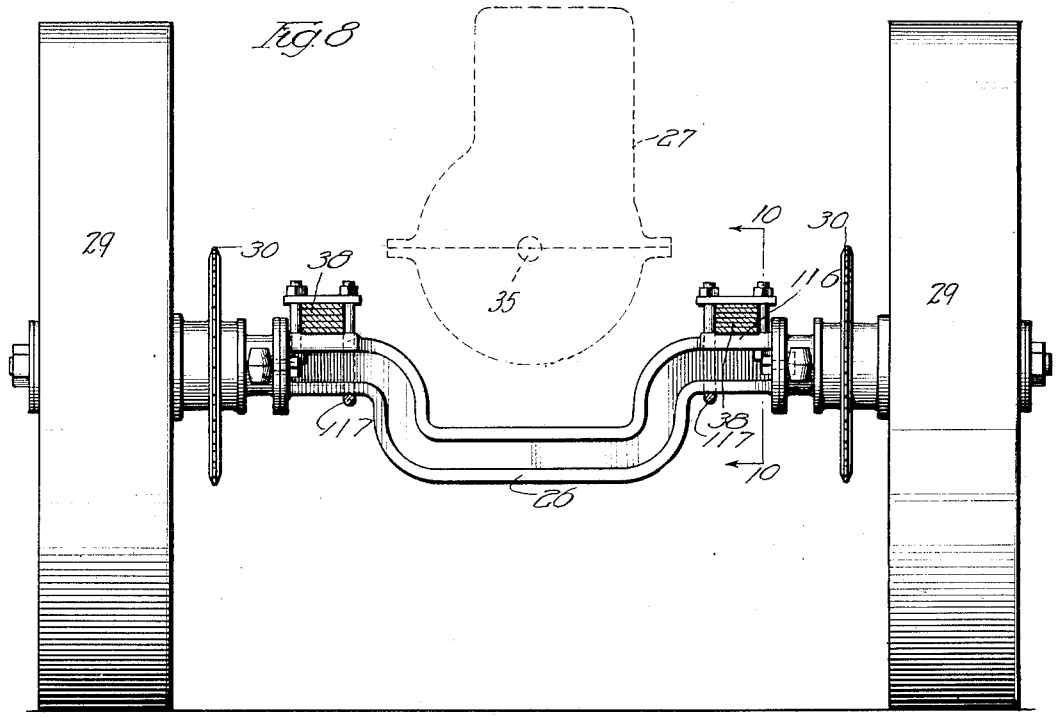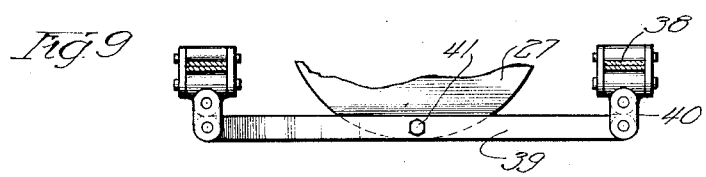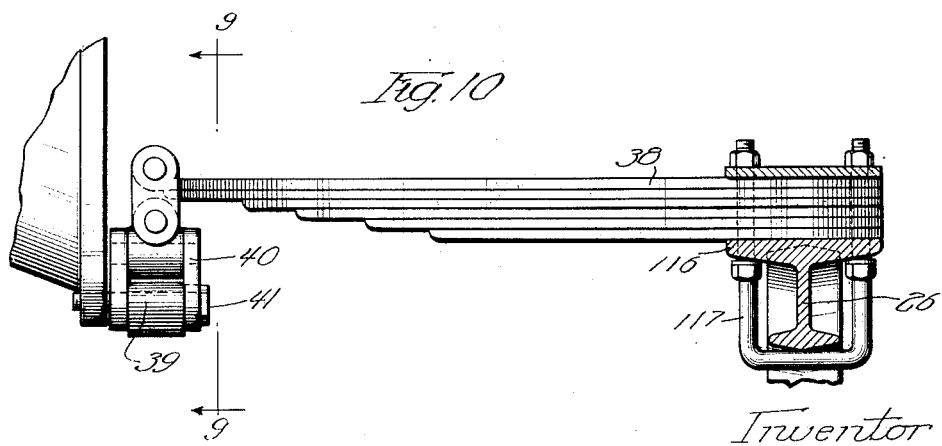

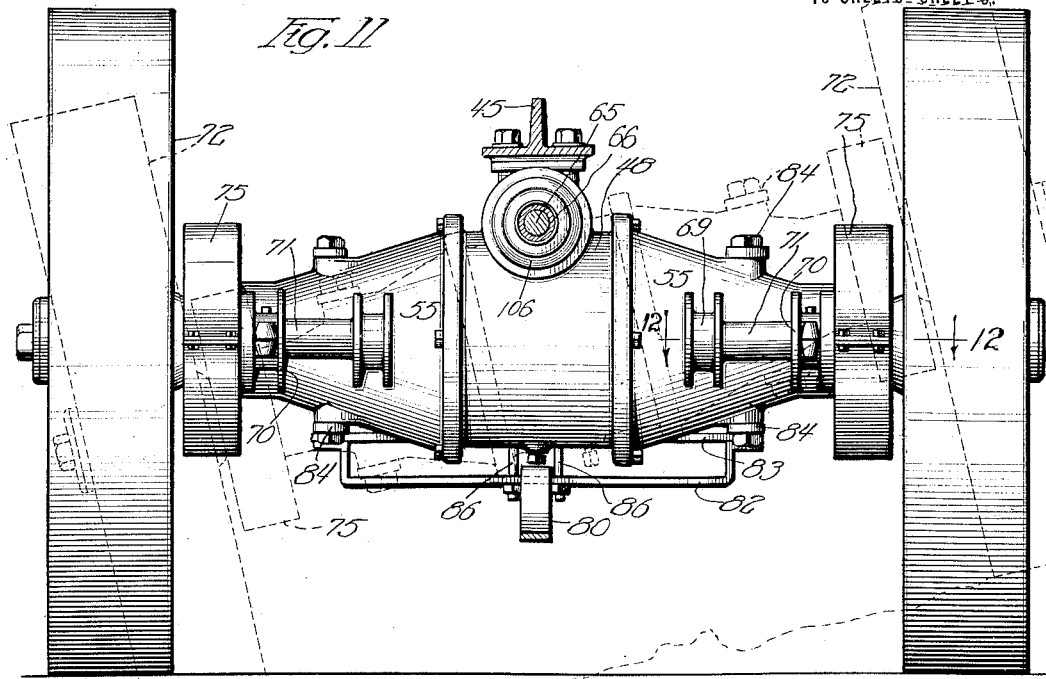
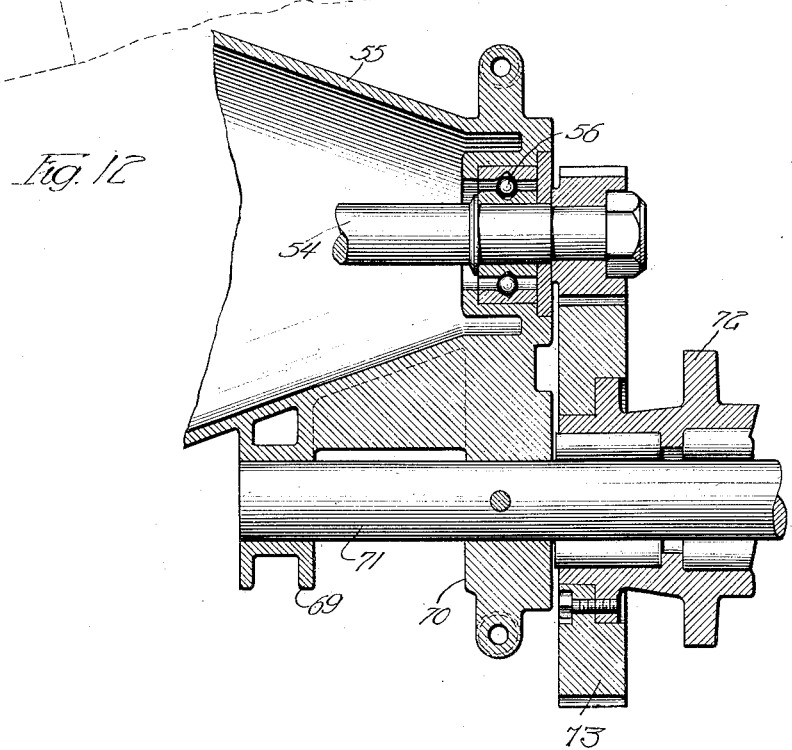

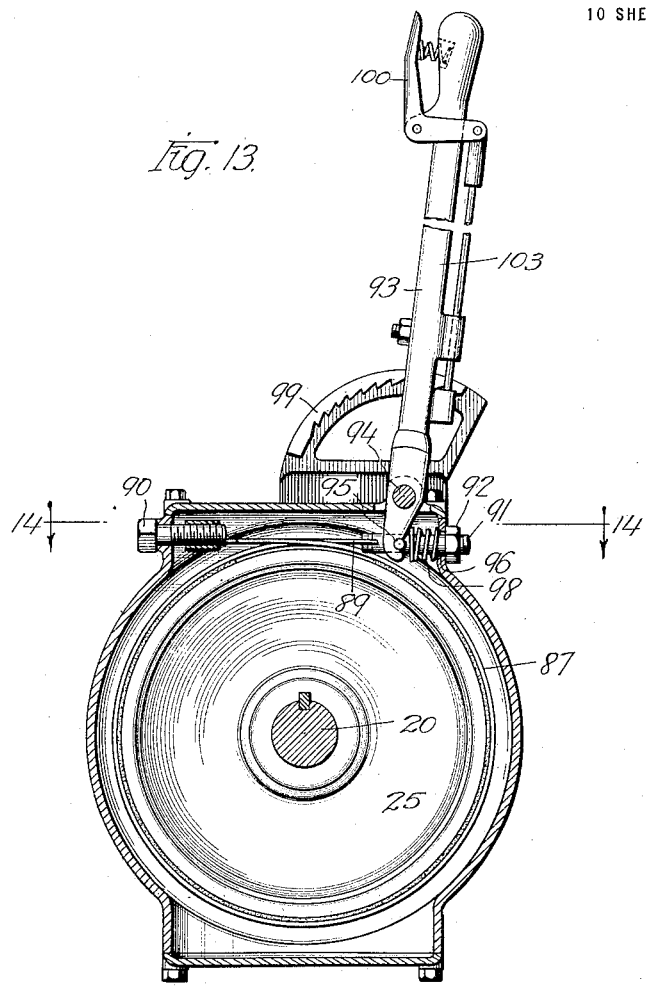
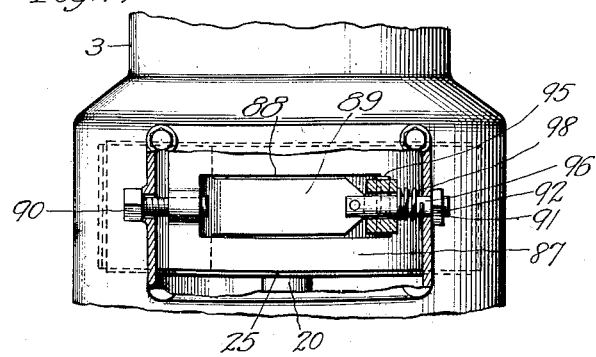

UNITED STATES PATENT OFFICE.

JOHN O. HEINZE, OF BOYNE CITY, MICHIGAN, ASSIGNOR TO TRACTION ENGINE COMPANY, OF BOYNE CITY, MICHIGAN, A CORPORATION OF MICHIGAN.

TRACTOR.

1,393,780.   Specification of Letters Patent.   Patented Oct. 18, 1921.

Application filed December 6, 1919. Serial No. 343,019.

*To all whom it may concern:*

Be it known that I, JOHN O. HEINZE, a citizen of the United States, residing at Boyne City, in the county of Charlevoix and State of Michigan, have invented certain new and useful Improvements in Tractors, of which the following is a specification.

The invention relates to new and useful improvements in motor vehicles, and is particularly applicable to tractors of the general type commonly employed for drawing agricultural implements and the like.

The principal objects of my invention are to provide an improved four wheel drive tractor in an extremely flexible form, enabling same to accommodate itself to excessive irregularities or inequalities of the ground surface; to provide an improved tractor having a main section and a section pivoted to swing and trail behind the main section and communicate propelling power to supporting wheels of both sections from the same source of power; to construct a four wheel drive tractor so as to obviate the necessity of a differential or slip connection between the front and rear wheels; to provide an improved construction of the engine supporting frame affording greater strength than in tractors of this type heretofore constructed, without diminishing the flexibility of the tractor; to utilize the differential shaft housings as a cross connection between side arms of the tractor frame; to provide a draft connection having advantages over those heretofore provided, and in general, to provide a simple and improved construction for a vehicle of the general character described.

Figure 1:
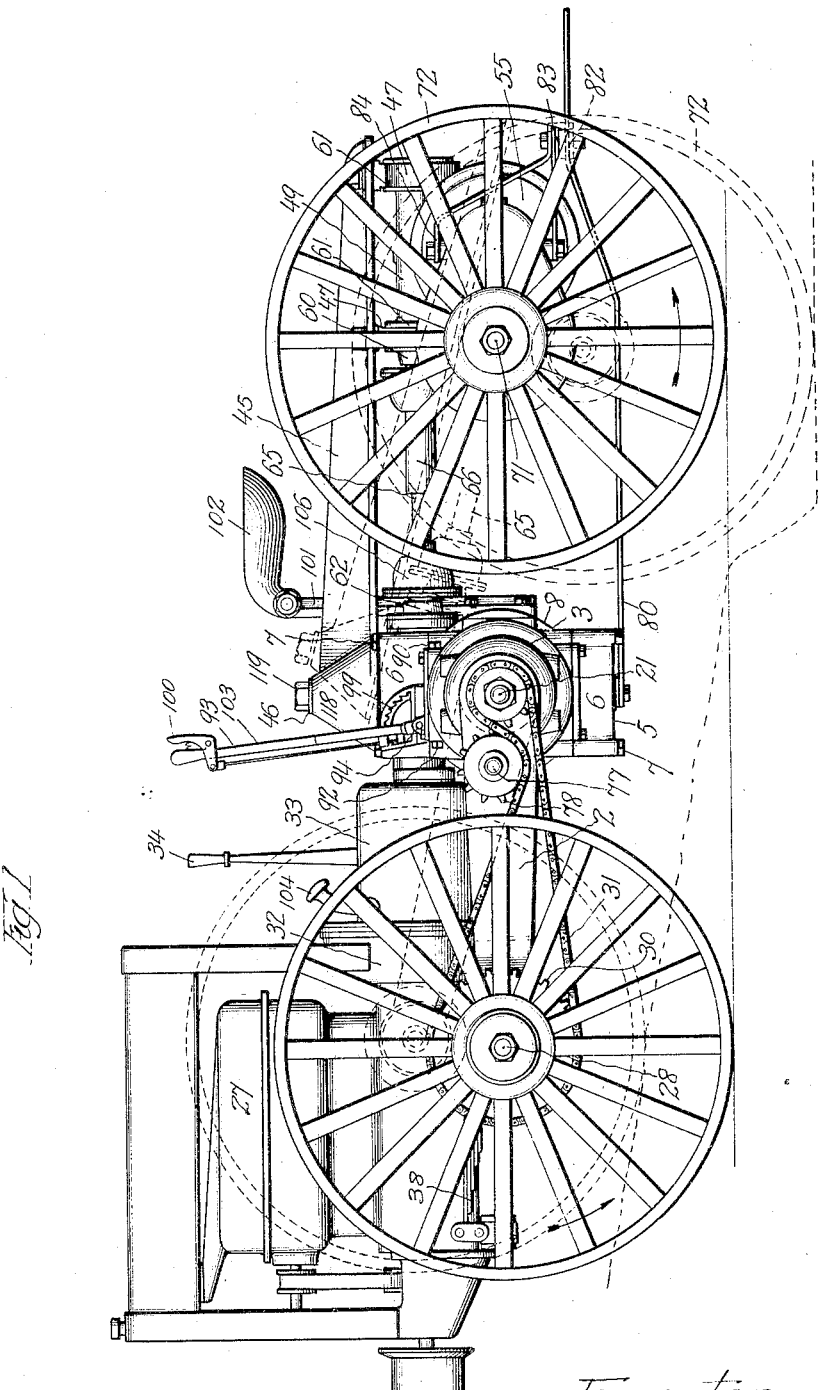
Figure 2:
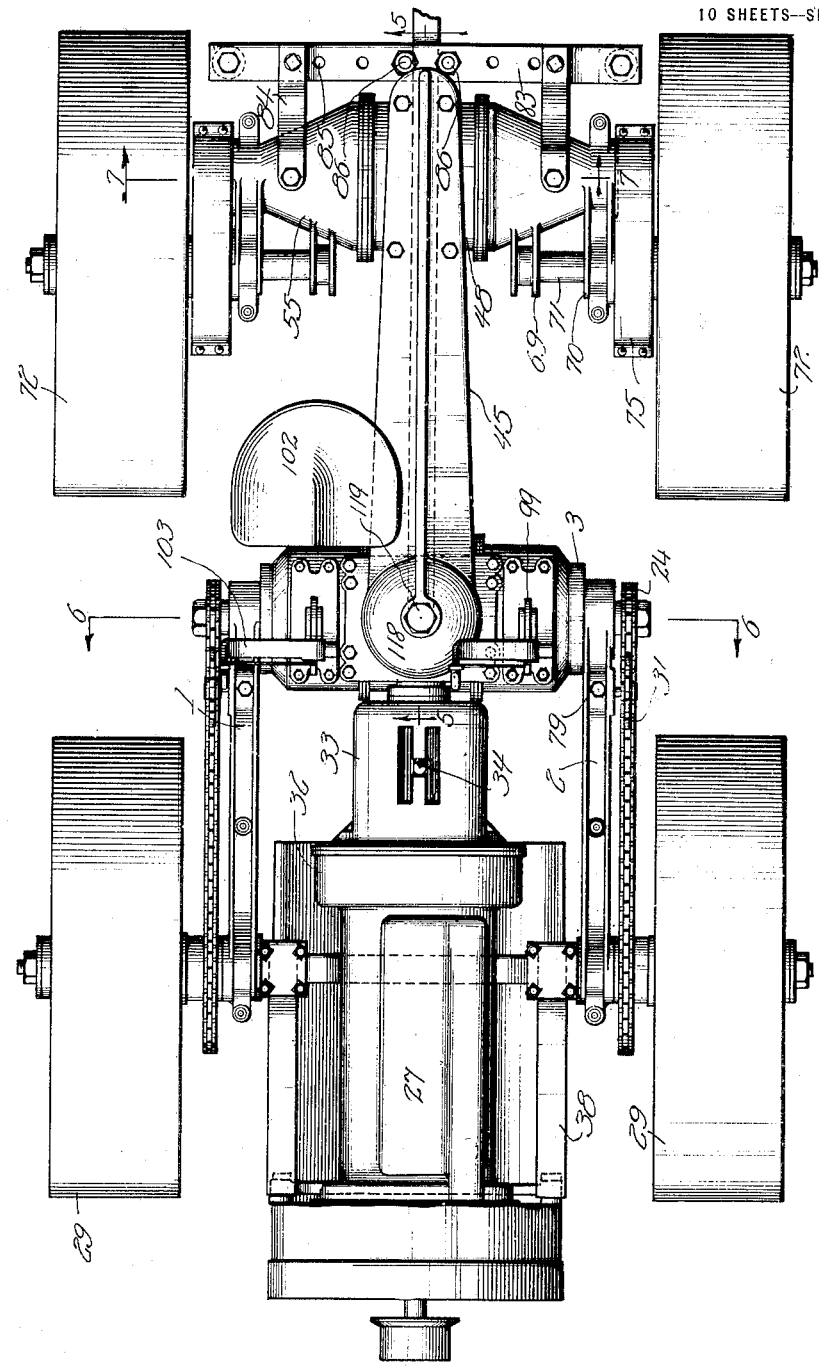
Figure 3:
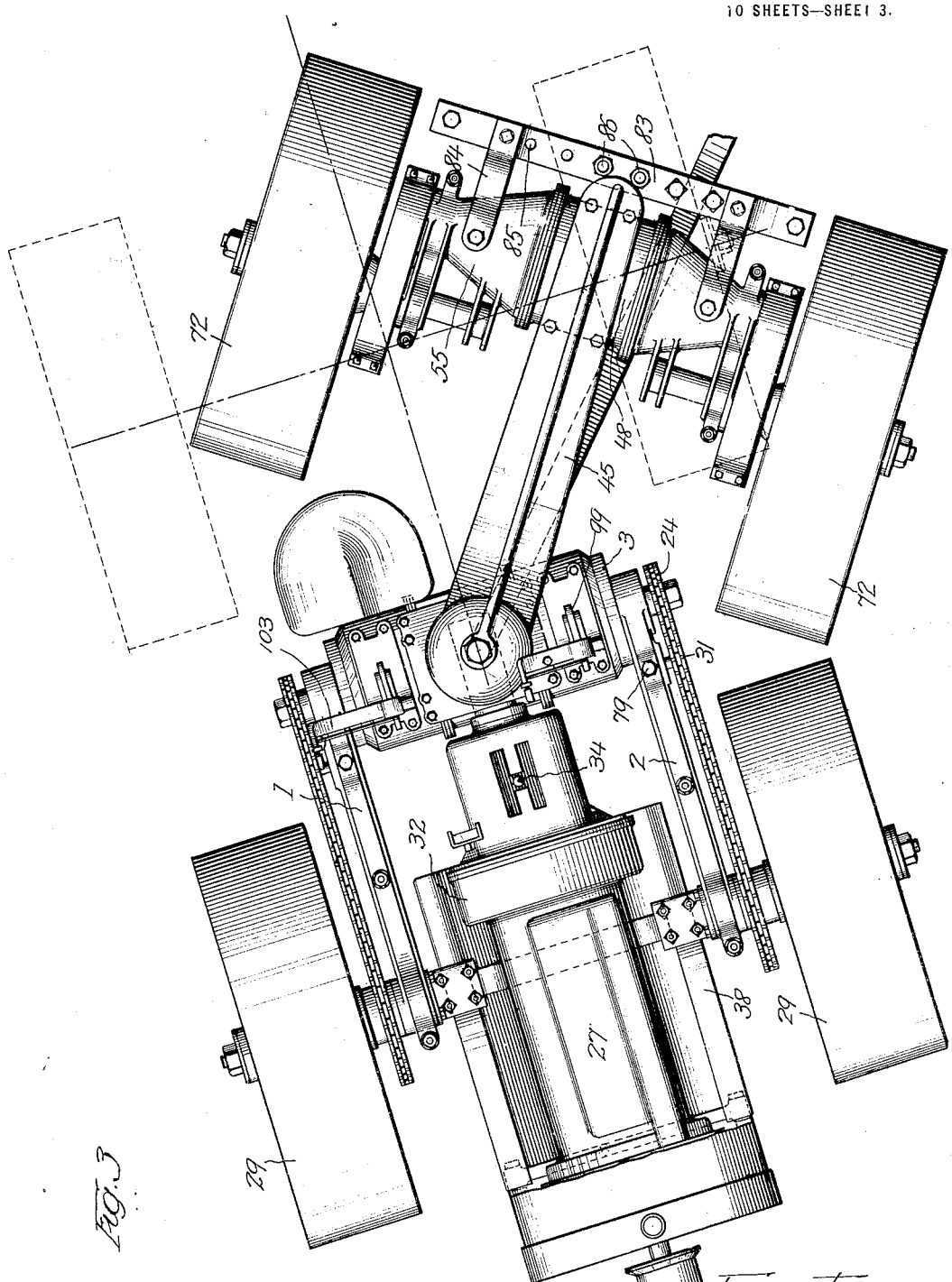

On the drawings, Figure 1 is a side view of a tractor embodying my improvements; Fig. 2 a top view thereof; Fig. 3 a similar view showing the adjustment of the tractor sections in making a turn; Fig. 4 an enlarged side view of the forward portion of the tractor; Fig. 5 a sectional view of the rear portion of the tractor taken on the line 5—5 of Fig. 2; Fig. 6 an enlarged vertical sectional view of the front differential and adjoining parts taken on the line 6—6 of Fig. 2; Fig. 7 a view partly in section on the line 7—7 of Fig. 2; Fig. 8 a front view of the tractor with the spring supports for the motor in section; Fig. 9 a front view of the support for the forward end of the motor; Fig. 10 an enlarged side view of a spring support for the motor taken on the line 10—10 of Fig. 8; Fig. 11, a sectional view on the line 11—11 of Fig. 5; Fig. 12 an enlarged sectional view on the line 12—12 of Fig. 11; Fig. 13 a sectional view on the line 13—13 of Fig. 6, and Fig. 14 a sectional view on the line 14—14 of Fig. 13.

Referring to the drawings, the reference numerals 1 and 2 indicate right and left side arms, respectively, of the main frame of the tractor, each of which is formed at its rear end with a chambered housing 3 projecting inwardly therefrom and enlarged to afford a case for brake mechanism. The housings 3 are rigidly secured together in spaced relation by bridge members 4 and 5 located at the top and bottom thereof, respectively, each of which has a flange 6 at each side thereof secured respectively to the opposite housings 3 by bolts 7. The inner end of each housing 3 is open and surrounded by a flange 8 forming a shoulder at its junction with the wall of the housing, and a differential housing is pivotally supported between the inner ends of the two housings 3. This differential housing comprises a pair of laterally spaced diaphragm plates 9, each of which has a centrally arranged bearing 10 and a peripheral seat 11, which latter receives the shoulder at the inner end of the respective housings 3 whereby the differential housing is mounted to oscillate therebetween. The diaphragms 9 are secured together and held in spaced relation by a substantially cylindrical shell 12 which has an annular flange 13 at each end thereof secured to the rim of the corresponding diaphragm 9 by cap screws 14.

This differential housing 9—9—12 has a worm wheel 15 mounted therein, said wheel being provided with a hub 16 at each side engaging in the bearings 10 of the diaphragms 9, and this worm wheel 15 is chambered at 17 and provided therein with differential mechanism comprising bevel gears 18 and 19 keyed on the inner ends of the shafts 20 and 21 respectively, and meshing with bevel pinions 22 pivotally mounted on the worm gear 15 in the chamber 17 thereof. This is a common form of differential mechanism which will be readily understood by those versed in the art, and requires no further explanation. The shafts 20 and 21 extend outwardly from opposite sides of the differential mechanism, being mounted to rotate in the hubs 16 at opposite sides of the worm wheel 15, and extend out through bearings 23 at the outer ends of the housings 3 of the arms 1 and 2 respectively. A sprocket 24 is secured on the outer projecting end of each shaft, and a brake drum 25 is also secured on each shaft within the housing 3.

The forward ends of the arms 1 and 2 are rigidly connected together by the front axle 26, which latter is centrally depressed, as shown in Fig. 8, to afford sufficient room for the motor 27 thereabove, and has wheel spindles 28 at each end thereof beyond the arms 1 and 2 upon which the front supporting wheels 29 are mounted. Each of these wheels has a sprocket 30 secured thereto intermediate of the wheel and the adjoining arm 1 or 2, and a chain 31 connects each sprocket 30 with the corresponding sprocket 24 of the shaft 20 or 21 for operating the front supporting wheels through the medium of the differential mechanism just described. For tightening the chains 31 each of the arms 1 and 2 is formed with a vertical slot 76 in which a spindle 77 is adapted to be clamped, said spindle being formed with a lateral extension upon which an idler sprocket 78 is mounted to rotate, and located so as to engage the upper length of the chain 31 to take up the slack therein. Adjusting screws 79 may be provided in the arm 1 or 2 extending into the slot 76 to facilitate adjustment of the spindle therein and accordingly the adjustment of the sprocket 78.

The motor 27 may be of any suitable construction and has a fly wheel case 32 at the rear end and a gear case 33 therebeyond in which speed changing gears are provided as usual and adjusted by a gear shift lever 34 for controlling the operation of the tractor. The rear end of the gear case 33 which is constructed as a rigid part of the motor unit, is secured directly to the shell 12 of the differential housing, as indicated at 115 in Fig. 5, so that the motor is capable of oscillatory movement with the differential housing 9—9—12 around the axis of the shafts 20 and 21, and the drive shaft 35, which extends rearwardly from the gear case 33, is properly positioned to extend through an upper extension 37 of the shell 12, and has the worm 36 fixed thereon within the extension 37 and meshing with the worm wheel 15 of the differential housing so as to communicate power from the motor 27 to the differential mechanism.

For supporting the forward end of the motor each of the arms 1 and 2 has a spring seat 116 at its forward end, and upon each seat a multiple leaf spring 38 is clamped by U-bolts 117, which also embrace the axle 26, and these springs project forwardly as shown in Fig. 2, one at each side of the motor. An equalizer bar 39 is supported between the forward ends of the springs 38, being provided with a link 40 pivoted thereto at each end thereof and to the corresponding spring 38, and a forward portion of the motor 27 is pivoted to the center of the equalizer bar 39, as indicated at 41 in Fig. 9.

The bridge member 4 above the differential is formed with an elevated boss 42 having an annular bearing seat 43 around the base thereof and a stud 44 at the top, and a trailer arm 45, which is suitably ribbed for reinforcing, has a socket 118 at the forward end engaged over the boss 42 and provided with an annular rim at the bottom engaging in the seat 43, and an aperture at the top fitting on the stud 44. A large cap screw 119 is threaded into a central aperture of the stud 44 against a washer plate 46 which clamps against the top of the stud 44 and overlaps the top of the socket 118 so as to hold the latter on the boss 42 and permit free swinging movement of the trailer arm 45.

The rear end of the arm 45 has a pair of longitudinally spaced depending bearings 47 secured thereto with the apertures thereof in alinement, and a rear differential housing 48 is pivotally secured in said bearings, said housing being formed with an upward extension 49 having forwardly and rearwardly extending trunnions 50 engaged in the apertures of the depending bearings. The differential housing 48 has a worm gear 51 mounted therein between diaphragm plates 52, and provided with an internal chamber with differential bevel gears and pinions similar to those in the previously described differential mechanism, and shaft sections 53 and 54 extend outwardly respectively at each side of the differential mechanism through tubular housings 55 at opposite sides of the differential housing. The outer ends of said shafts are journaled in bearings 56 at the outer extremities of said housings. A shaft 57 extends through the upper extension 49 of the differential housing 48 and through the trunnions 50, being concentric therewith, and said shaft has a worm 58 secured thereon and inclosed in the upper extension 49 and meshing with the worm wheel 51 of the differential mechanism within the housing 48. The rear end of the shaft 57 is journaled in a bearing provided therefor in the end cap 59 which is secured to the rear end of the extension 49, and the forward end of the shaft 57 is reduced and extends through a bearing in the end cap 60 which is secured to the forward end of the tubular extension 49. The extension 49 has a flange 61 at the inner side of each depending bearing 47, and the end caps 59 and 60 engage against these bearings at the opposite sides and serve to retain the trunnions of the extension 49 in the bearings 47 so as to oscillate freely therein.

The shaft 35 which carries the worm 36 for operating the front differential mechanism, projects rearwardly through an end cap 2 at the rear of the upper extension 37 of the front differential housing, and the rear extremity of the shaft 35 has a universal or knuckle joint 63 secured thereto. The shaft 57 has a similar universal or knuckle joint 64 secured to its forward end, which is connected to the universal joint 63 by an extensible connection comprising the shaft 65 which telescopes within the sleeve 66 and has a transverse pin 67 engaging in longitudinal slots 68 to afford a sliding connection and insure a positive rotary driving connection therebetween. Each universal joint 63 and 64 is inclosed in a housing comprising a disk or plate 105 secured to and turning with the shaft 35 or 57, and having the shell 106 secured thereto and surrounding the universal joint, said shell being provided with an opening 107 through which the shaft 65 or sleeve 66 extends. The inner surface of each shell 106 just inside the opening 107 is of semi-spherical contour, and the shaft 65 and sleeve 66 each has a coöperating shell 108 secured thereon and having a flared portion 109 within the shell 106 with a packing ring 110 interposed therebetween so as to engage the inner surface of the shell 106 and permit relative movement of the shaft 65 or sleeve 66 with respect to the shell 106 and maintain a tight joint therebetween so as to exclude dirt and enable the universal joint to be packed in grease.

Each lateral housing 55 of the rear differential is provided with a pair of spaced, forwardly extending brackets 69 and 70 in which shafts or wheel spindles 71 are fixed, and each spindle has a rear supporting wheel 72 mounted to rotate thereon. Each wheel is provided at the inside with a spur gear 73 which meshes with a pinion 74 on the outer extremity of the corresponding differential shaft 53 or 54, the ratio thereof being such as to drive the rear supporting wheels 72 at the same rate of speed as the front supporting wheels 29 are operated by the chain connection 31. A gear case 75 is preferably provided to inclose the gears 73 and 74, and a chain guard may be provided to inclose the chain 31 and sprockets 24 and 30 if so desired.

The tractor is designed particularly for agricultural purposes and is intended for pulling implements and the like, and to afford a convenient draft connection a drawbar 80 is pivoted at its forward end at 81 to the lower bridge plate 5 of the front differential, and has the rear end engaged between two vertically spaced, transversely extending bars 82 and 83 which are mounted by means of the brackets 84 on the lateral housings 55 of the rear differential. These bars 82 and 83 are provided with corresponding perforations 85 through which pins or bolts 86 may be passed so as to hold the draw bar in various positions of lateral adjustment, as for example as shown in Fig. 3, so as to trail the implement drawn by the tractor at the desired position therebehind.

For affording directional control to the tractor there is a brake band 87 mounted in each lateral housing 3 of the front differential, and adapted to engage the respective brake drums 25 for selectively retarding the shafts 20 and 21. Each brake band 87 completely encircles its drum 25 and has the ends crossed at the top, one of the ends being slotted at 88 and the other end reduced to afford a tongue 89 which passes through the slot 88. The slotted end of the band is secured in any suitable manner as by means of the adjusting screw or bolt 90 to the wall of the housing, and the other end or tongue 89 of the band is connected with the pin 91 which slides loosely through an aperture 96 in the wall of the housing and has a nut 92 threaded onto the outer end. A lever 93 is pivoted to the housing at 94 and has a bifurcated lower end in the housing straddling the pin 91 and engaging trunnions 95 thereon, so that the pin 91 may be shifted outwardly through the aperture 96 of the housing against the tension of the spring 98 for contracting the brake band 87 into close engagement with the brake drum 25. A segment 99 is located adjacent each lever 93 and said lever provided with a grip lever 100 for operating a dog which coöperates with the segment 99 to lock the lever 93 in any position to which it may be adjusted.

A seat post 101 is secured to and extends upwardly from one of the lateral housings 3 of the front differential at a suitable distance from the trailer arm 45 so that the latter may swing to any extent required without interference from the post, and there is an operator's seat 102 mounted on the upper end of this post. The braking or directional control levers 93 are offset toward the side of the tractor at which the seat 102 is located, as indicated at 103, so that the handle portions thereof are within convenient reach of the operator occupying the seat 102, and the gear shift lever 34 is also arranged so as to be within convenient reach of the operator. A clutch pedal 104, such as is commonly employed to control the clutch connection between the motor and gears in the gear case 33, is also located to be conveniently operated by the foot of the operator in the seat 102.

While I have shown and described my invention in a particular form, I am aware that various changes and modifications may be made therein without departing from the principles of my invention, the scope of which is to be determined by the appended claims.

I claim as my invention:

1. In a tractor, the combination of a main frame comprising a pair of spaced arms fixedly united at their rear ends, a front supporting wheel mounted at the forward end of each arm, a motor resiliently mounted between the arms, a trailer arm pivoted intermediate of the rear ends of said arms and supported at the rear end by a pair of rear supporting wheels, and means for communicating power from the motor to the front and rear supporting wheels.

2. In a tractor, the combination of a frame comprising a pair of laterally spaced arms fixedly united at their rear ends and having a front differential mechanism interposed therebetween, a front axle connecting and extending downwardly between the forward ends of the arms and having a front supporting wheel mounted at each end thereof, a motor resiliently mounted between the arms and connected with, and adapted to oscillate around the differential mechanism, a trailer arm pivoted centrally between the rear ends of the aforesaid arms, and having a rear differential mechanism pivoted to oscillate laterally on the rear end thereof, a rear supporting wheel connected with the last mentioned differential mechanism at each side of the trailer arm, means for operating the rear differential from the motor simultaneously with the front differential, and connections for operating the front supporting wheels and the rear supporting wheels from the front and rear differential mechanisms respectively.

3. In a tractor, the combination of a pair of laterally spaced arms having a differential mechanism interposed between the rear ends thereof, means fixedly uniting the rear ends of the arms, a front supporting wheel at the forward end of each arm operated by said differential mechanism, a motor resiliently supported between the forward ends of the arms and connected with the differential mechanism and having the rear end pivoted on the transverse axis of said differential mechanism, and a trailer arm vertically pivoted to the aforesaid means and having a pair of supporting wheels at the rear end thereof.

4. In a tractor, the combination of a frame comprising a pair of side members each having a supporting wheel, a differential mechanism interposed therebetween and having a housing pivotally mounted between the side members to oscillate on a transverse axis, a cross member rigidly uniting the side members, a motor connected with the differential mechanism and mounted at the rear end on said differential housing, and means for resiliently supporting the motor at a distance from the differential housing on the side members.

5. In a tractor, the combination of a frame comprising a pair of side members, a differential mechanism interposed between and a housing therefor oscillatably mounted on the rear ends of the side members, a saddle rigidly connecting the rear ends of the side members, a front axle connecting the forward ends of the side members and having a supporting wheel at each end thereof, a motor resiliently mounted between the side members and connected with the differential mechanism and having the rear end fixed to the differential housing, connections for operating the supporting wheels from the differential mechanism, a trailer arm vertically pivoted on the said saddle and having a differential mechanism pivoted on the rear end thereof, and connected for operation with the first mentioned differential mechanism and a supporting wheel at each side of the trailer arm operated by the differential mechanism thereon.

6. In a tractor, the combination of a front frame having a pair of supporting wheels, a motor mounted on the frame, a trailer arm vertically pivoted to the front frame and having a pair of supporting wheels at the rear end thereof, connections for simultaneously operating the front and rear supporting wheels from the motor, and a draft member connected to the front frame and slidably supported at the rear end of the trailer arm.

7. In a tractor, the combination of a front frame having a pair of supporting wheels, a motor mounted on the frame, a trailer arm vertically pivoted to the front frame and having a pair of supporting wheels at the rear end thereof, connections for simultaneously operating the front and rear supporting wheels from the motor, a draft member connected to the front frame, a transverse support for the draft member at the rear end of the trailer arm, and means for adjusting said draft member laterally on said support.

8. In a tractor, the combination of a frame having a differential mechanism at the rear end thereof, a pair of front supporting wheels ahead of said differential mechanism and operated thereby, a motor mounted on the frame, a trailer arm vertically pivoted to the frame and having a differential mechanism pivoted at the rear end thereof, a rear supporting wheel at each side of the trailer arm and operated by the last mentioned differential mechanism, driving connections for operating both differentials simultaneously from the motor, a draft member pivoted to the aforesaid frame and a support at the rear end of the trailer arm slidably supporting the rear end of the draft member to permit lateral oscillation thereof.

9. In a tractor the combination of a frame comprising a differential housing, an arm at each side of and extending forwardly from the differential housing, and means rigidly connecting said arms, a rearwardly extending arm having its forward end connected to the frame between the rear ends of the first mentioned arms, a supporting wheel on each arm and a motor on the frame for propelling the tractor.

10. In a vehicle, the combination of a differential mechanism, a housing therefor, a motor operatively connected with the differential mechanism and extending forwardly therefrom, means resiliently supporting the forward end of the motor, and means horizontally pivoting the rear end of the motor to the differential housing so as to permit oscillation of the motor with respect to the differential housing without interrupting the operative connection of the motor with the differential mechanism.

11. In a tractor, the combination of a longitudinal frame having supporting wheels at each end, a differential housing on the frame, a motor having one end pivotally supported by the housing and the other end resiliently supported on the frame, and differential mechanism in the housing operatively connecting the motor with the supporting wheels at one end of the frame.

12. In a tractor, the combination of a frame having a pair of supporting wheels at each end, a differential housing on the frame having an intermediate portion oscillatable on a transverse axis of the frame, a motor having one end supported by said intermediate portion and the other end resiliently supported on the frame and a differential mechanism in the housing operatively connecting the motor with the supporting wheels at one end of the frame.

13. In a tractor, the combination of a leading and trailing section, one of which comprises a pair of laterally spaced arms, having a differential housing interposed therebetween at one end and an axle interposed between and connecting the other ends, a supporting wheel on each end of the axle, a supporting wheel on the other section, a motor resiliently mounted between the arms and having the rear end thereof horizontally pivoted to the differential housing, and differential mechanism in the housing operatively connecting the motor with the supporting wheels on the axle.

14. In a tractor, the combination of a main frame comprising a differential casing having a housing extending laterally at each side thereof, each having an arm fixed thereto and extending forwardly from the outer end thereof, a supporting wheel at the forward end of each arm, a differential mechanism in the aforesaid casing having a differential shaft extending laterally through each housing and connected with the supporting wheels, a trailer arm pivotally mounted intermediate of said housings and having a pair of rear supporting wheels at the rear end thereof, a differential mechanism at the rear end of said arm for operating said rear supporting wheels, and a motor adapted to simultaneously operate both differential mechanisms.

JOHN O. HEINZE.